Nov. 4, 1958 E. M. USAB ET AL 2,859,151
METHOD AND APPARATUS FOR THE CENTRIFUGAL CASTING
OF FIBER-REINFORCED PLASTIC PIPE
Filed Sept. 3, 1953 2 Sheets-Sheet 1
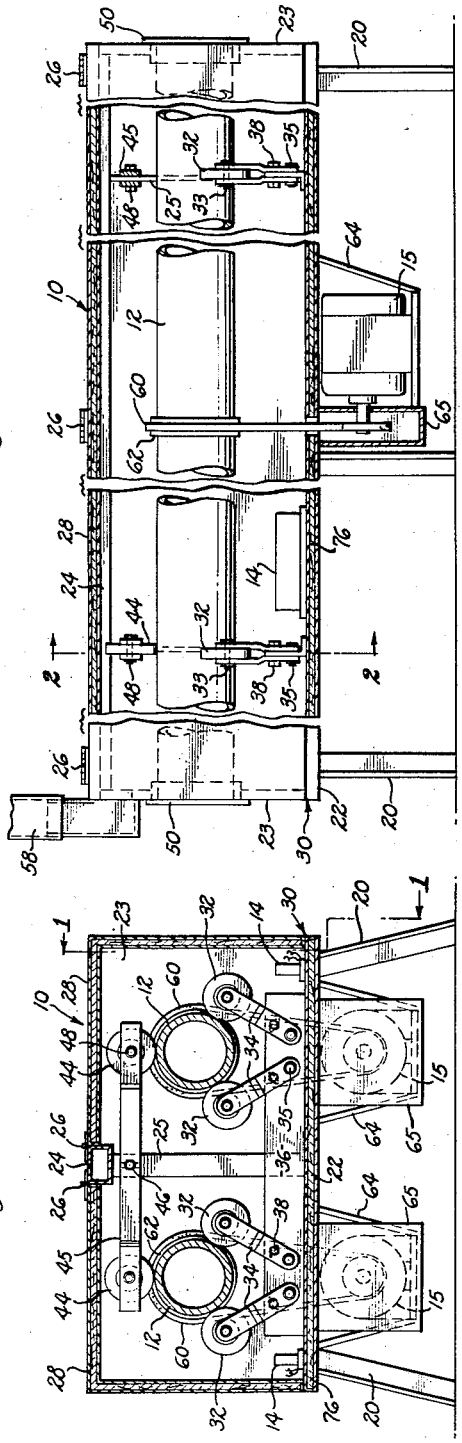
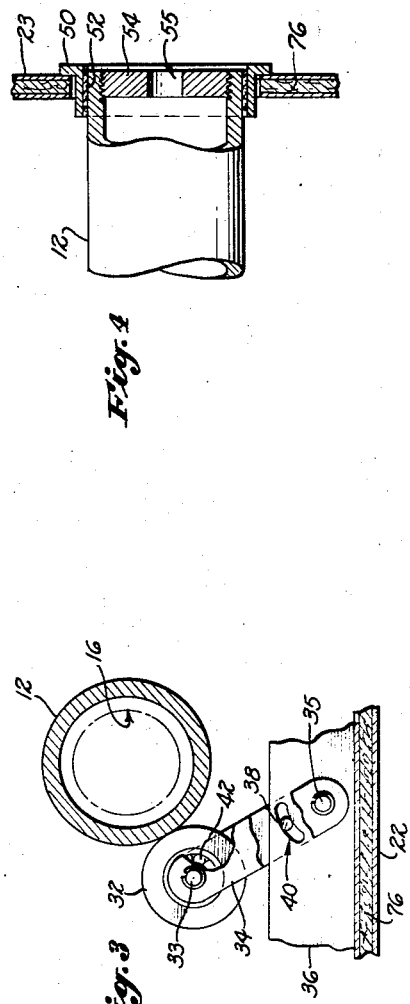
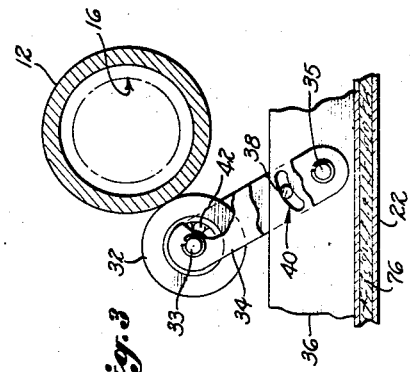
INVENTORS:
ERNEST M. USAB
MARTIN A. USAB
BY THEIR ATTORNEYS
HARRIS, KIECH, FOSTER & HARRIS

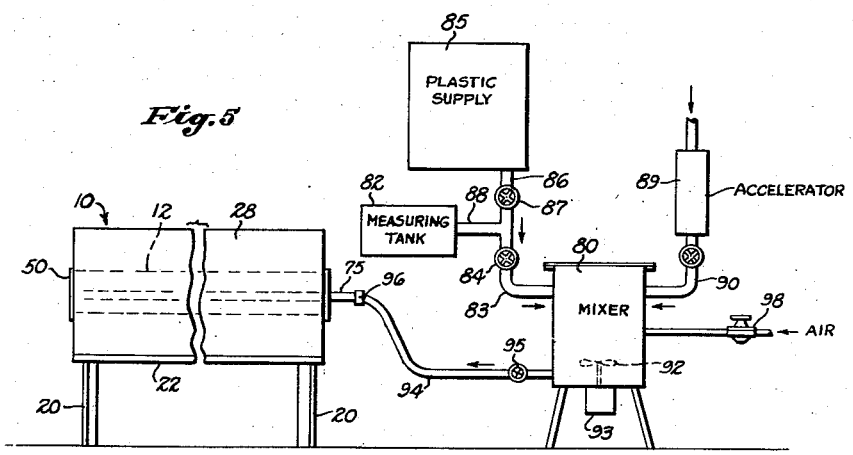
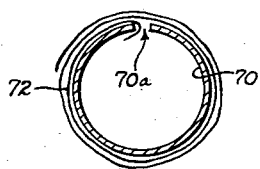
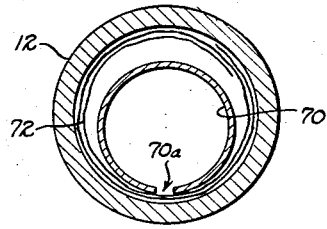
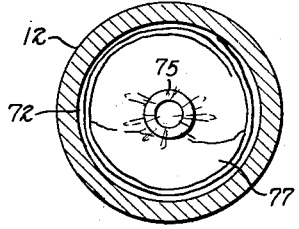
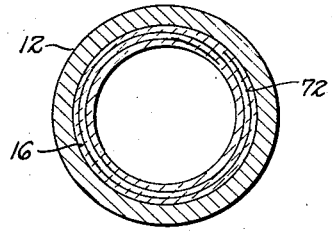
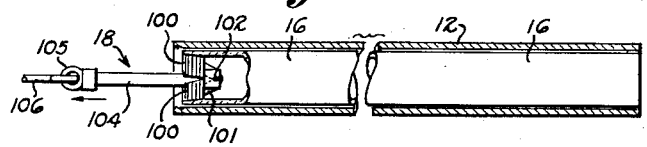

United States Patent Office 2,859,151
Patented Nov. 4, 1958

2,859,151

METHOD AND APPARATUS FOR THE CENTRIFUGAL CASTING OF FIBER-REINFORCED PLASTIC PIPE

Ernest M. Usab and Martin A. Usab, Gardena, Calif., assignors to Reflin Co., Gardena, Calif., a corporation of California Application September 3, 1953, Serial No. 378,296

9 Claims. (Cl. 154—83)

This invention relates to a method for casting reinforced pipe producible from various synthetic thermosetting plastics, and to apparatus to be used in conjunction therewith.

One object of the invention is to provide both apparatus and procedures which are simple, relatively economical, efficient, and especially adapted to rapid production.

Another object of the invention is to provide a procedure by which reinforced plastic pipe may be accurately produced in accordance with the required specifications.

A further object of the invention is to provide apparatus, as well as a procedure, through the medium of which pipe may be easily produced from thermosetting plastics and the like which shall be uniform in construction and dimensions for any required size.

Other objects of the invention will be apparent from the following specification and the accompanying drawings wherein certain embodiments of the invention are illustrated:

In the drawings:

Fig. 1 is a longitudinal vertical section of casting and curing apparatus with which plastic pipe may be centrifugally cast in accordance with this invention, the section being indicated by the line 1—1 of Fig. 2;

Fig. 2 is a cross section of the apparatus as indicated by the line 2—2 of Fig. 1;

Fig. 3 is an enlarged detail showing the relationship between a mounting roller and a casting cylinder in which pipe is centrifugally produced in accordance with this invention;

Fig. 4 is an enlarged sectional detail showing means for closing one end of a casting cylinder and positioning the same with respect to the end of an oven in which the cylinder is mounted;

Fig. 5 is a more or less diagrammatic elevation of various items of equipment employed in conjunction with the casting and curing of pipe in accordance with this invention;

Fig. 6 is a cross section illustrating the mounting of a reinforcing mat on a split cylinder preliminary to introduction into a casting cylinder;

Fig. 7 is a similar view indicating the disposition of a fiber mat of Fig. 6 within the casting cylinder and its disconnection centrifugally from the spirit cylinder or mandrel of Fig. 6;

Fig. 8 is a similar cross section indicating the introduction of a liquid thermosetting plastic into the casting cylinder within the mat or reinforcing material illustrated in Fig. 7;

Fig. 9 is another cross section indicating diagrammatically the centrifugally completed cast plastic pipe uniformly disposed within the casting cylinder and the thorough impregnation of the reinforcing mat so that the mat provides a helical reinforcement within the plastic body which is set by heat while spinning the casting cylinder; and Fig. 10 illustrates means and a corresponding operating step for withdrawing the cast, thermally set plastic pipe from the casting cylinder.

Briefly the apparatus used includes an insulated oven generally indicated at 10 which rotatably carries within it one or more elongated casting cylinders 12, the oven 10 being appropriately heated as by electric heaters 14 so that the casting cylinders 12 are raised to a proper temperature during spinning thereof by means of respective electric motors 15, whereby after spinning for a sufficient length of time the plastic has not only been properly distributed to a uniform thickness on the inner wall of the respective casting cylinder 12 by centrifugal action, but has also been properly set by required application of heat.

After appropriate curing, the cast pipe or tubing indicated at 16 in Figs. 9 and 10 is readily removable by appropriate withdrawing apparatus generally indicated at 18 in Fig. 10 as presently to be described more fully.

The oven 10 is shown as being supported upon a plurality of legs 20, and as seen in Fig. 2 as accommodating two cylindrical casting cylinders 12. The oven comprises an insulated bottom wall 22 and upstanding end walls 23 preferably rigidly mounted upon the bottom wall 22. Extending longitudinally of the machine and between the end walls 23, there is provided at the top of said end walls an elongated beam 24 which may be insulated and may be in the form of a hollow tube as shown in Fig. 2. This longitudinal beam 24 serves for the rigid attachment of upright standards 25 which extend between the bottom wall 22 and the beam 24, and such beam also provides for the mounting of hinges 26 for two right-angular covers 28, both of which may be swung to elevated position for access to the interior of the oven 10. The lower edges of the normally upstanding portions of these covers 28 normally rest upon the corresponding edge portions of the bottom wall 22 as indicated at 30. Thus, for the purpose of installation, repairs, adjustment and the like, the angular covers 28 may be raised at will and also be lowered to the illustrated operating position. These covers as well as the end walls 23 are of insulated construction like the bottom wall 22.

For the purpose of accurately supporting the longitudinally extending casting cylinders 12 in operative position, spaced portions of each cylinder 12 are supported upon spaced pairs of adjustable positioning rollers 32 provided to underlie corresponding side portions of the respective cylinders 12 as best illustrated in Fig. 2. The rollers 32 are journalled at 33 in the upper ends of upwardly directed arms 34, each arm 34 supporting a roller 32, as illustrated in Figs. 2 and 3. Each arm 34 is pivoted at 35 in a transverse anchoring bar 36 which is flanged at its lower edge and secured fixedly to the bottom wall 22 of the oven 10. An adjacent portion of each arm 34 also carries a lock bolt 38 which is adjustable in a slot 40 of arcuate configuration disposed in an upper portion of the anchoring plate or bracket 36. By tightening each bolt 38, the respective roller 32 is easily fixed in adjusted position. Thus, by adjusting the arms 34 and the rollers 32, the exact height of the respective casting cylinder 12 is readily established. By including roller or ball bearings 42 in the mounting of each roller 32, an efficient mounting is assured. In order to retain each casting cylinder 12 down in suitable driving position on the rollers 32, a positioning roller 44 is mounted to engage the upper surface of the respective cylinder 12, there being as many positioning rollers as required, and these may be equal in number to the spaced pairs of supporting rollers 32. The positioning rollers 44 are pivotally mounted upon the outer ends of a transverse positioning arm 45 which is adjustably pivoted at its middle to the corresponding standard 25, as seen at 46. As illustrated, each end of the arm 45 is bifurcated so that the respective positioning roller 44 may lie between the bifurcations, such bifurcations providing suitable support for the corresponding shaft 48 of each roller 44.

The opposite ends of each cylinder 12 are adapted to be received in suitable flanged collars (Fig. 4) as indicated at 50, the flanges engaging the outer wall of the respective oven ends 23. If desired, appropriate packing 52 may be carried between the outer wall of the respective end of each cylinder 12 and the inner wall of the cylindrical portion of the collar 50. Each end of each cylinder 12 receives a threaded head 54 to close the end of the cylinder, such head being provided with a central vent opening 55. The oven 10, as seen in Fig. 1 may be provided with a ventilating flue 58.

High speed rotation of each casting cylinder 12 is effected from its motor 15 through the medium of a drive belt 60 which passes over a flat or other suitable pulley 62 suitably located on the outer wall of each cylinder 12. As illustrated, each motor 15 is conveniently suspended from the under side of the bottom wall 22 of the oven 10 by suitable bracket means 64, the lower end of the pulley 60 being housed in a cage 65.

In preparing to cast reinforced pipe, a split sleeve or cylinder 70 is employed which has a length substantially equal to the length of the pipe to be molded and to the length of the casting cylinders 12 between the heads 54. Around this cylinder 70, there is wrapped to the extent of two or three or more turns a fibrous sheet 72, which in a preferred form is a suitable matting of glass fibers, such as that known on the market as "Fiberglas." This fiber sheet 72 has one edge inserted through the slot 70a of the split sleeve 70, whereupon the sleeve 70 is rolled to produce the desired number of convolutions of the fibrous mat. The split sleeve 70 with the mat 72 thereon is then introduced lengthwise into the respective casting cylinder 12, the latter then being spun by action of the motor 15 in a direction opposite to the winding direction of the mat 72 so that the mat 72 is laid up against the inner wall of the casting cylinder 12. Thereupon the split sleeve 70 is removed. Appropriate heads 54 are then threaded into the ends of the respective cylinder 12, and liquid plastic material of chosen quality is introduced into the interior of the cylinder 12 and the fibrous mat 72 which now acts as a lining, such mat 72 now being of considerably greater diameter than when it reposed upon the split sleeve 70 which is in practice approximately the relative diameter seen in Fig. 7.

Having introduced the liquid plastic throughout the length of the cylinder 12 in any appropriate manner, as presently to be described, the hot casting cylinder 12 is rotated at high speed for sufficient time, not only to saturate the wrapped mat 72, but also to cure the uniform layer of plastic material lining the casting cylinder 12 and saturating the mat 72. The distribution of the liquid plastic material may take place through a distribution conduit such as a hose or pipe 75 as indicated in Figs. 5 and 8, which pipe may be perforated for uniform distribution, or may be moved uniformly and progressively through the length of the respective casting cylinder 12 at a suitable rate as the liquid is being introduced. When the cylinder 12 is spun, the plastic body assumes the condition indicated in Fig. 9 where the cast pipe 16 appears as a liner for the casting cylinder 12, the fibrous reinforcing mat 72 being imbedded in the plastic material, these materials setting in substantially the relationship illustrated in Fig. 9, the fibrous mat 72 preferably forming two or more convolutions with the ends overlapped somewhat, approximately as illustrated.

The liquid distributing pipe or conduit 75 is introduced in any appropriate manner, such as by way of the central opening 55 in one of the heads 54 in the ends of the casting cylinder 12. With the two heads 54 in place, these form smooth flush ends at the ends of the pipe 16 being cast. Since all of the various walls of the oven 10 are thoroughly insulated, as by means of appropriate insulation 76 disposed between two plate members constituting each of the walls, the casting cylinders 12 are easily maintained at the required temperatures through the medium of the electric heaters 14, at all times, so that, after the body of liquid plastic material 77 (Fig. 8) is distributed by centrifugal action, the setting of the plastic takes place quite promptly.

The means for furnishing the plastic material to the distributing pipe or conduit 75 is illustrated in Fig. 5. This means includes a mixing tank 80 having connection with a measuring tank 82 by way of a line 83 and valve 84, the measuring tank 82 being in turn connected with a main supply tank 85 by way of a line 86 having a control valve 87. The supply tank 85 contains the required resinous or other plastic material of which the pipe 16 is to be cast. In the particular form shown, the lines 83 and 86 and the measuring tank 82 are connected by a branch T 88 disposed between the valves 84 and 87. By closing the valve 84 while opening the valve 87, the measuring tank 82 is filled with just that quantity of material required to cast one pipe 16. Any means for regulating the amount of plastic to be received in the measuring tank 82 for the casting of any particular size of pipe will be used. By closing the valve 87 and opening the valve 84 a measured quantity of plastic is then run into the mixer 80 into which there is also run a measured quantity of accelerator (if required) from an accelerator-measuring tank 89 by way of a valved line 90. An appropriate agitator 92 in the mixing tank 80 is operated through a motor 93 to insure adequate admixture.

The mixed batch of liquid plastic is then supplied to the distributing pipe or conduit 75 by way of a line 94 which carries a control valve 95 and is connected to the conduit 75 by an appropriate connection 96. Discharge of the batch in the mixing tank 80 may be effected through the medium of air applied under pressure from an air line 97 carrying a suitable regulating valve 98, the valves in the lines 83 and 90 being closed for this stage of the operation. Any appropriate technique for distributing the liquid plastic as indicated in Fig. 8 may be employed.

The required liquid plastic charge having been introduced by way of the conduit 75 into the respective casting cylinder 12, the latter is rotated at high speed by its motor 14 to effect the desired casting. The heads 54 serve to produce flush finished ends of the cast pipe when set by the influence of the heat furnished by the heaters 14.

The forming and setting stage having been completed, the length of pipe 16 produced will have shrunk slightly from the inner wall of the casting cylinder 12 so that the pipe section may be removed without difficulty by the appropriate previously mentioned apparatus 18 seen in Fig. 10. Such a removing apparatus includes two or more arcuate gripping members 100 whose outer walls are serrated for the purpose of gripping the corresponding inner wall portion of the cast pipe 16, these members 100 being carried respectively on arms 101 pivoted at 102 on the inner end of an actuating shank 104 which, if desired, may be connected through an eye 105 with any appropriate draft means 106 such as a cable or chain. By reason of the disposition of the pivot 102 at the end of the actuating shank 104, remote from the draft means 106, the gripping members 100 are readily introduced into the end of the cast pipe 16 in frictional engagement with the pipe inner wall. Draft upon the actuating shank 104, working through the pivot 102, causes sufficient expansion of the gripping members 100 to insure adequate engagement with the inner pipe wall so that the pipe is readily withdrawn. After withdrawal of the pipe, a limited amount of flexing of the pipe end and manipulation of the tool 18 permit the latter to be disengaged.

From the foregoing it will be apparent that there is provided relatively simple apparatus for the efficient casting of plastic pipe containing any reinforcing fabric, particularly mat reinforcement of "Fiberglas" or similar type. At the same time the apparatus is relatively economical. The only precision work required is that to finish the casting cylinders 12. The adjustable mountings for the cylinder-supporting rollers 32 facilitate accurate alignment of the cylinders, and the motor drive construction shown provides simple means for high speed rotation during casting and setting. With the insulated oven illustrated, adequate heating is economically effected through the medium of electric resistance heaters 14 such as indicated. When it is desired to cast pipe of a different size, it is necessary merely to remove one or both of the cylinders 12 of a given size and substitute a cylinder or cylinders of a different size, the positions of the supporting rollers 32 to accommodate the different sizes being easily varied as above indicated, and the positions of the retaining rollers 44 above the cylinders being easily adjusted accordingly.

It is intended to cover such modifications of the invention herein disclosed as fall within the scope of the patent claims.

We claim as our invention:

1. A method for casting plastic, reinforced pipe including the steps of: applying on the inner wall of an elongated horizontal casting cylinder a reinforcing fabric of tubular configuration by wrapping said fabric in sheet form around a mandrel, introducing the wrapped mandrel into said cylinder, rotating said cylinder in a direction to unwind the fabric from the mandrel and removing the freed mandrel; introducing into said cylinder uniformly along the length thereof a quantity of liquid thermosetting resin material sufficient to make a pipe thereof; rotating said casting cylinder at high speed about its longitudinal axis to centrifugally distribute said liquid resin on said inner wall and embed therein said fabric; applying heat to said cylinder to set said resin material; and continuing the heating and rotation for a time to produce a set reinforced pipe from said resin material.

2. A method as in claim 1 including employing a split sleeve as said mandrel, and introducing an edge portion of said fabric into the split of said sleeve for retention thereby while wrapping, said edge portion being disengaged by said first-mentioned rotation of said cylinder to unwind the fabric from the mandrel.

3. Apparatus for casting reinforced plastic pipe including: an elongated casting cylinder; means mounting said cylinder for high speed rotation about its longitudinal axis; means for rotating said cylinder at high speed; a mandrel for wrapping thereon reinforced fabric and insertable as a unit into said casting cylinder for application of the wrapped fabric on the inner wall of said cylinder by reverse rotation, said mandrel having a slot for receiving and releasing an edge of such fabric; means for introducing thermosetting liquid resin into the interior of said cylinder for distribution upon said fabric and said inner wall to yield a tubular form; and means for heating said cylinder and resin to set said resin while rotating the cylinder and the tubular resin shape.

4. Apparatus as in claim 3 wherein said casting cylinder is disposed on a horizontal axis.

5. A method for casting plastic reinforced pipe including the steps of: wrapping a reinforcing fabric sheet into a tube in a plurality of convolutions; placing said wrapped fabric tube within an elongated hollow casting cylinder; rotating said cylinder in a direction opposite to the direction of wrap of said fabric tube to apply the fabric against the inner wall of said casting cylinder; introducing into said cylinder within said applied fabric tube a quantity of liquid thermosetting resin material sufficient to produce a pipe; rotating said cylinder at high speed to distribute said liquid thermosetting resin material centrifugally on said inner wall and imbed said fabric in said thermosetting resin material; heating said cylinder to a temperature to heat and set said thermosetting resin material; and continuing the heating of said cylinder and thermosetting resin material and the rotation thereof for a time to produce a set reinforced pipe of said thermosetting resin material.

6. A method as in claim 5 including rotating said cylinder on a horizontal axis, and applying said liquid resin material uniformly within said sheeted fabric from end to end of said cylinder and fabric tube.

7. A method as in claim 6 including forming said fabric sheet into said tube on a split mandrel by mounting an end of the fabric in the split in said mandrel and wrapping the fabric about the mandrel to produce said convolutions.

8. A method for casting reinforced plastic pipe including the steps of: wrapping sheet fabric about an elongated mandrel to form a plurality of convolutions; introducing said elongated mandrel and fabric wrapped thereon as a unit into a hollow elongated casting cylinder; rotating said catsing cylinder in a direction opposite to the direction of wrapping said fabric on said mandrel to unwrap the convoluted fabric from said mandrel and apply it to the inner wall of said casting cylinder; removing the freed mandrel from said casting cylinder; applying liquid thermosetting resin material uniformly along the length of the fabric convolute and said casting cylinder in quantity sufficient to imbed the fabric and produce a plastic pipe; rotating said casting cylinder at high speed to centrifugally distribute said liquid resin material on said inner wall and imbed said fabric therein; and heating said cylinder to a temperature to heat and set said resin material while continuing the rotation to produce a set reinforced plastic pipe.

9. A method as in claim 8 wherein said mandrel is a split mandrel, the method including the steps of introducing an end of said sheet fabric into the split of said mandrel to retain the fabric, and wrapping the fabric on said mandrel, the unwrapping rotation in said cylinder freeing said fabric end from said split of said mandrel.

References Cited in the file of this patent

UNITED STATES PATENTS

| | | |
|---|---|---|
| 753,959 | Crump | Mar. 8, 1904 |
| 1,318,520 | Wolever | Oct. 14, 1914 |
| 1,577,531 | Lambert et al. | Mar. 23, 1926 |
| 1,668,763 | Dickson | May 8, 1928 |
| 1,776,547 | Carrington | Sept. 23, 1930 |
| 1,840,027 | Fetter | Jan. 5, 1932 |
| 1,995,977 | Gonda | Mar. 26, 1935 |
| 2,085,959 | Donegan | July 6, 1937 |
| 2,278,858 | Fields | Apr. 7, 1942 |
| 2,386,034 | Church | Oct. 2, 1945 |
| 2,614,058 | Francis | Oct. 14, 1952 |
| 2,633,605 | Brucker | Apr. 7, 1953 |
| 2,701,403 | Chanlund | Feb. 8, 1955 |